US012618480B2

(12) United States Patent
Shou et al.

(10) Patent No.: US 12,618,480 B2
(45) Date of Patent: May 5, 2026

(54) BALL VALVE

(71) Applicant: ZHEJIANG DUNAN ARTIFICIAL ENVIRONMENT CO., LTD., Shaoxing (CN)

(72) Inventors: Zhouyang Shou, Shaoxing (CN); Yongbin Xuan, Shaoxing (CN); Ligang Hua, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 0 days.

(21) Appl. No.: 18/780,641

(22) Filed: Jul. 23, 2024

(65) Prior Publication Data

US 2024/0384802 A1  Nov. 21, 2024

Related U.S. Application Data

(63) Continuation of application No. PCT/CN2023/072349, filed on Jan. 16, 2023.

(30) Foreign Application Priority Data

Jan. 26, 2022  (CN) .......................... 202220260076.8

(51) Int. Cl.
*F16K 5/06* (2006.01)
*F16K 27/06* (2006.01)
*F16K 41/02* (2006.01)

(52) U.S. Cl.
CPC .......... *F16K 5/0605* (2013.01); *F16K 5/0647* (2013.01); *F16K 5/0694* (2013.01); *F16K 27/067* (2013.01); *F16K 41/02* (2013.01)

(58) Field of Classification Search
CPC .... F16K 5/0605; F16K 5/0647; F16K 5/0694; F16K 27/067; F16K 41/02
(Continued)

(56) References Cited

U.S. PATENT DOCUMENTS 3,722,856 A * 3/1973 Koch ..................... F16K 5/0631
251/315.14
3,743,243 A * 7/1973 Scaramucci .......... F16K 5/0631
251/288
(Continued)

FOREIGN PATENT DOCUMENTS

| CN | 201173305 Y | 12/2008 |
| CN | 202302058 U | 7/2012 |

(Continued)

OTHER PUBLICATIONS

European search report of EP23746063.9.
International Search Report of PCT/CN2023/072349.

*Primary Examiner* — John Bastianelli

(57) ABSTRACT

The present application provides a ball valve. The ball valve includes a valve body, a valve seat, and a valve rod. The valve seat is installed on the valve body. One end of the valve rod is rotatably installed in the valve body, and the other end of the valve rod extends out of the valve body via the valve seat. A position of the valve rod penetrating through the valve seat is provided with a limiting convex ring. An end of the valve seat away from the valve body is provided with a convex edge. And an end of the convex edge towards the valve body abuts against the limiting convex ring to limit the valve rod from separating from the valve body.

7 Claims, 5 Drawing Sheets

(58) Field of Classification Search
USPC ................................................. 251/286–288
See application file for complete search history.

(56) References Cited

U.S. PATENT DOCUMENTS

| | | | | |
|---|---|---|---|---|
| 4,667,926 | A | | 5/1987 | Takeda et al. |
| 5,735,307 | A | * | 4/1998 | Charron ................ F16K 5/0642 |
| | | | | 251/315.01 |
| 6,095,493 | A | * | 8/2000 | Velan .................... F16K 5/0694 |
| | | | | 251/315.01 |
| 8,496,227 | B2 | | 7/2013 | McCoy et al. |
| 2010/0038574 | A1 | | 2/2010 | Chou |
| 2020/0355294 | A1 | | 11/2020 | Bobo et al. |

FOREIGN PATENT DOCUMENTS

| | | | |
|---|---|---|---|
| CN | 209146386 | U | 7/2019 |
| CN | 217381703 | U | 9/2022 |
| GB | 2347196 | A | 8/2000 |
| KR | 200319367 | Y1 | 7/2003 |
| KR | 1020130090461 | A | 8/2013 |

* cited by examiner

BALL VALVE

CROSS-REFERENCE TO RELATED APPLICATION

This application is a continuation of international patent application No. PCT/CN2023/072349, filed on Jan. 16, 2023, which claims priority to Chinese patent application No. 202220260076.8, filed on Jan. 26, 2022, and titled "BALL VALVE". The content of the above identified disclosure is hereby incorporated herein in its entirety by reference.

TECHNICAL FIELD

The present disclosure relates to a field of flow rate controlling technology, and in particular, to a ball valve.

BACKGROUND

A ball valve includes an opening or closing element driven by a valve rod and a valve rotating around an axis of the ball valve.

In particular, the valve rod in the ball valve is restricted on the valve body by a valve seat installed on the valve body, to prevent the valve rod from being pushed out of the valve body by a medium during an operation of the ball valve. At present, a limiting structure of a valve rod on a ball valve in related art is usually provided at a position where the valve rod penetrates through the valve seat, which realizes a limitation for the valve rod by the limiting component being in contact with the valve seat.

It can be understood that the ball valve with the above structure requires an outer diameter of a limit structure on the valve rod to be greater than an inner diameter of the valve seat. This requires that an outer diameter of a blank part used to prepare the valve rod should reach an inner diameter of the valve seat, and then the blank part is machined by a turning process to produce the valve rod, which requires a lot of materials, causing not only high material costs, but also a long length of the blank part being turned, resulting in increasing a machining cost.

SUMMARY

According to various embodiments of the present disclosure, a ball valve for solving above technical problem is provided.

A ball valve includes a valve body, a valve seat and a valve rod. The valve seat is installed on the valve body. One end of the valve rod is rotatably installed in the valve body, and the other end of the valve rod extends out of the valve body via the valve seat. A portion of the valve rod penetrating through the valve seat is provided with a limiting convex ring, an end of the valve seat away from the valve body is provided with a convex edge, and an end of the convex edge towards the valve body abuts against the limiting convex ring to prevent the valve rod from separating from the valve body.

In one embodiment, the convex edge abuts against the limiting convex ring by being in contact with each other.

In one embodiment, the convex edge is in a circular ring shape.

In one embodiment, along an axis direction of the valve seat, a size of the convex edge is not less than 3 mm.

In one embodiment, the limiting convex ring is integrated with the valve rod. In some embodiments, the convex edge is integrated with the valve seat.

In one embodiment, a sealing ring is embedded into the limiting convex ring, and the valve rod is assembled with and sealed with the valve seat by the sealing ring.

In one embodiment, a limiting component is provided on the valve seat, the valve rod is capable of abutting against the limiting component to restrict a maximum rotating angle of the valve rod in the valve seat as 90°.

In one embodiment, the valve rod is capable of abutting against the limiting component by one surface being in contact with another surface.

In one embodiment, the limiting component is disposed on an inner wall of the convex edge.

In one embodiment, an end surface of the limiting component towards the valve body abuts against the limiting convex ring; or a gap is formed between an end of the limiting component towards the valve body and the limiting convex ring.

Details of one or more embodiments of this disclosure are presented in the attached drawings and descriptions below. And other features, purposes and advantages of this disclosure will become apparent from the description, drawings and claims.

BRIEF DESCRIPTION OF THE DRAWINGS

For a better description and illustration of embodiments and/or examples of those disclosures disclosed herein, reference may be made to one or more attached drawings. Additional details or examples used to describe the drawings should not be considered as limiting the scope of any of the disclosed disclosures, currently described embodiments and/or examples, and currently understood best modes of these disclosures.

Reference signs are as follows.

10 represents a valve body; 20 represents a valve seat; 21 represents a convex edge; 211 represents an inner wall; 212 represents a step surface; 22 represents a limiting component; 221 represents a gap; 30 represents a valve rod; 31 represents a limiting convex ring; and 101 represents a sealing ring.

DETAILED DESCRIPTION

The following will provide a clear and complete description of the technical solution in the embodiments of the present disclosure, in communication with the accompanying drawings. Obviously, the described embodiments are only a part of the embodiments of the present disclosure, not all of them. Based on the embodiments in the present disclosure, all other embodiments obtained by ordinary skill in this art without creative labor fall within the scope of protection of the present disclosure.

It should be noted that, when a component is considered "set on" another component, it can be directly set on another component or there may be a centered component present simultaneously. When a component is considered "disposed on" another component, it can be directly fixed to another component or there may be a centered component present simultaneously. When a component is considered "fixed to" another component, it can be directly fixed to another component or there may be a centered component present simultaneously.

Unless otherwise defined, all technical and scientific terms used in this article have the same meanings as those commonly understood by those skilled in the technical field of the present disclosure. The terms used in the specification of the present disclosure are only for the purpose of describing specific embodiments and are not intended to limit the present disclosure. The term "or/and" used in this article includes any and all combinations of one or more related listed items.

Figure 1:
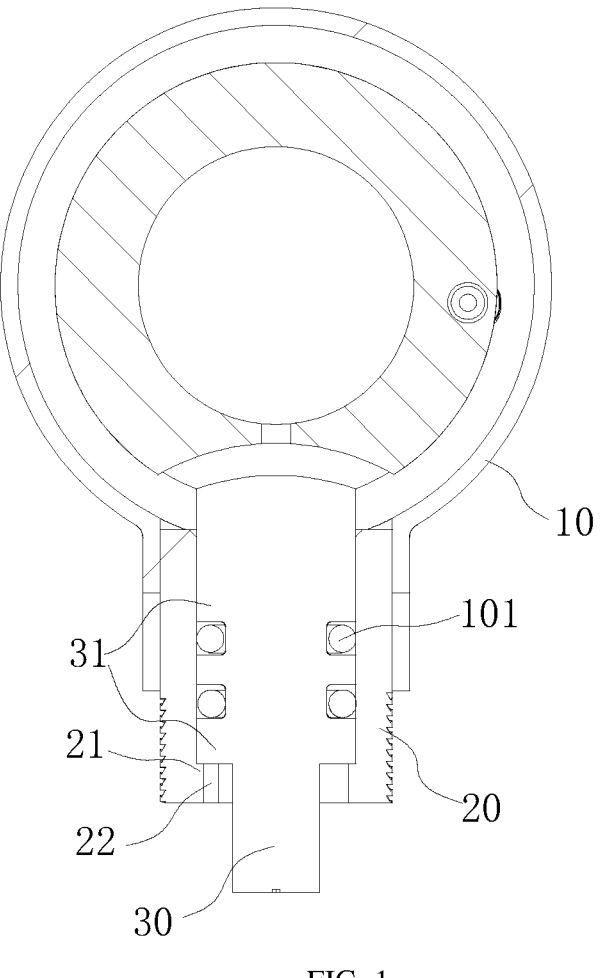
FIG. 1 is a cross-sectional schematic diagram of a ball valve in one or more embodiments of the present disclosure.
Figure 2:
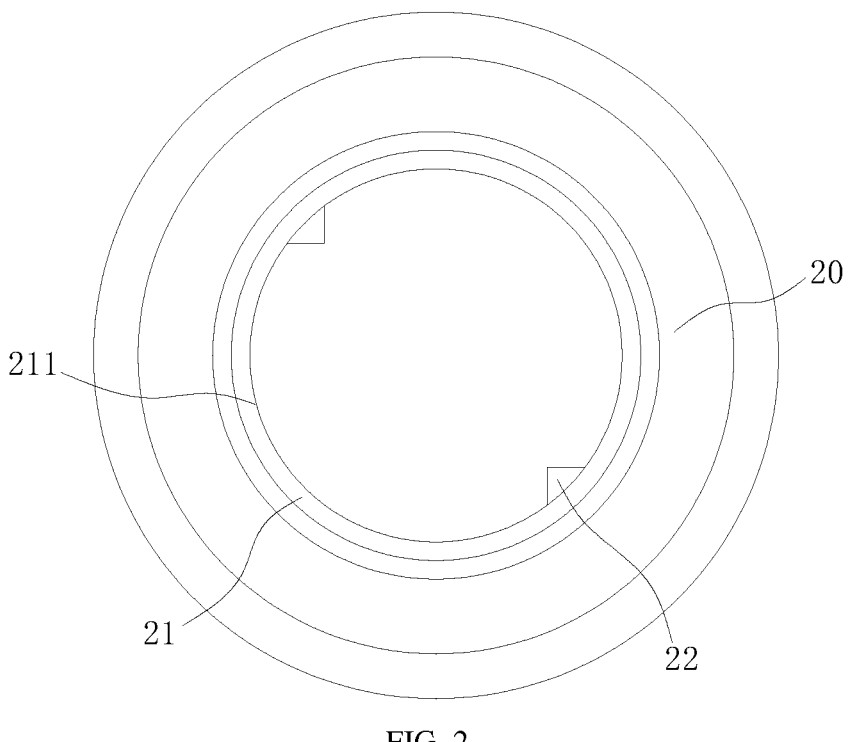
FIG. 2 is a bottom view of a valve seat in one or more embodiments of the present disclosure.
Figure 3:
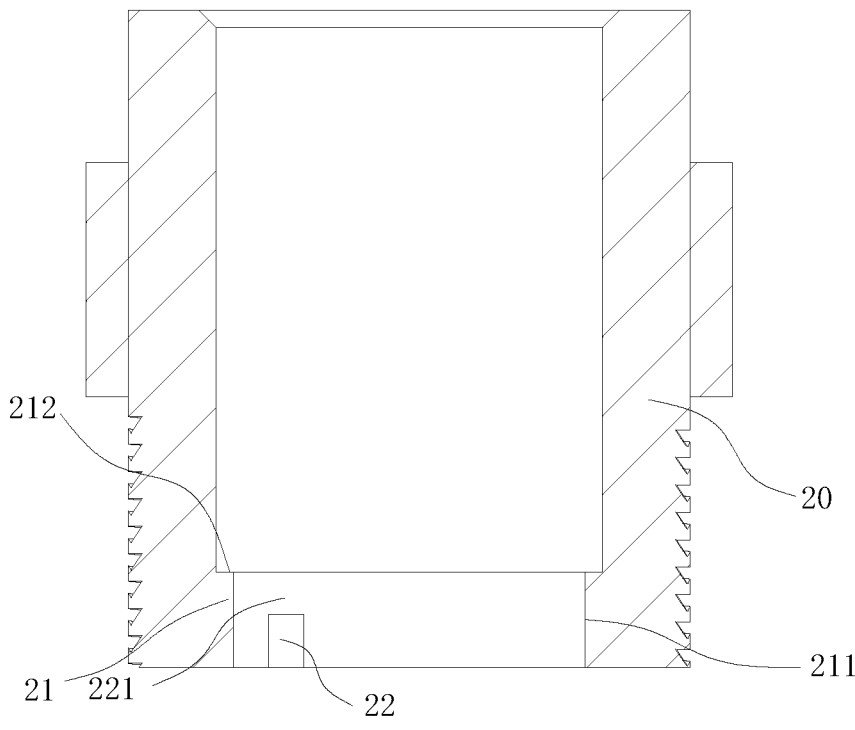
FIG. 3 is a cross-sectional schematic diagram of a valve seat in one or more embodiments of the present disclosure.
Figure 4:
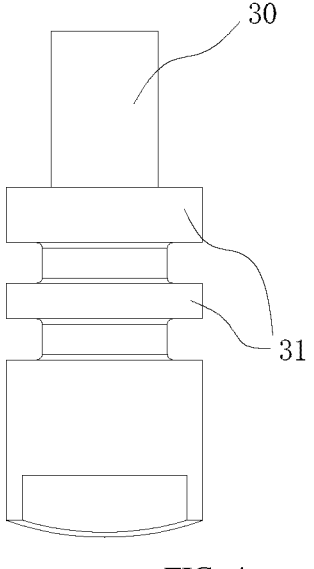
FIG. 4 is a schematic diagram of a valve rod in one or more embodiments of the present disclosure.
Figure 5:
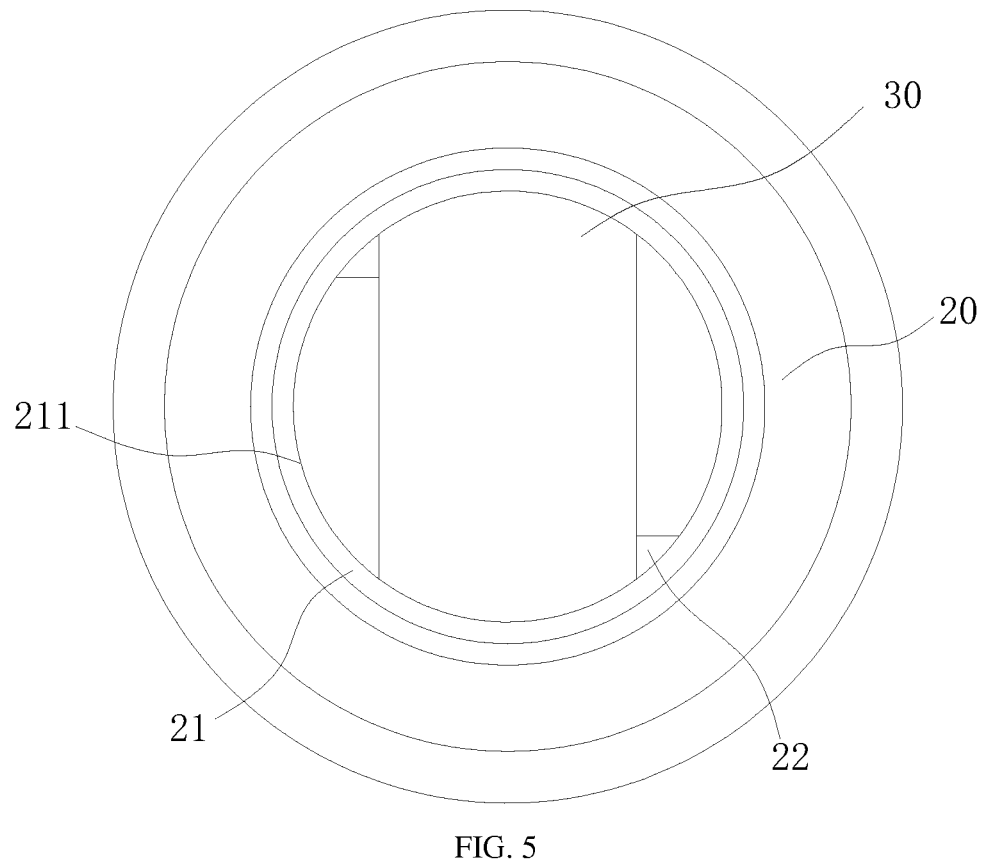
FIG. 5 is a bottom view of a valve seat and a valve rod when a limiting component of the valve seat abuts against the valve rod in an embodiment of the present disclosure.
Figure 6:
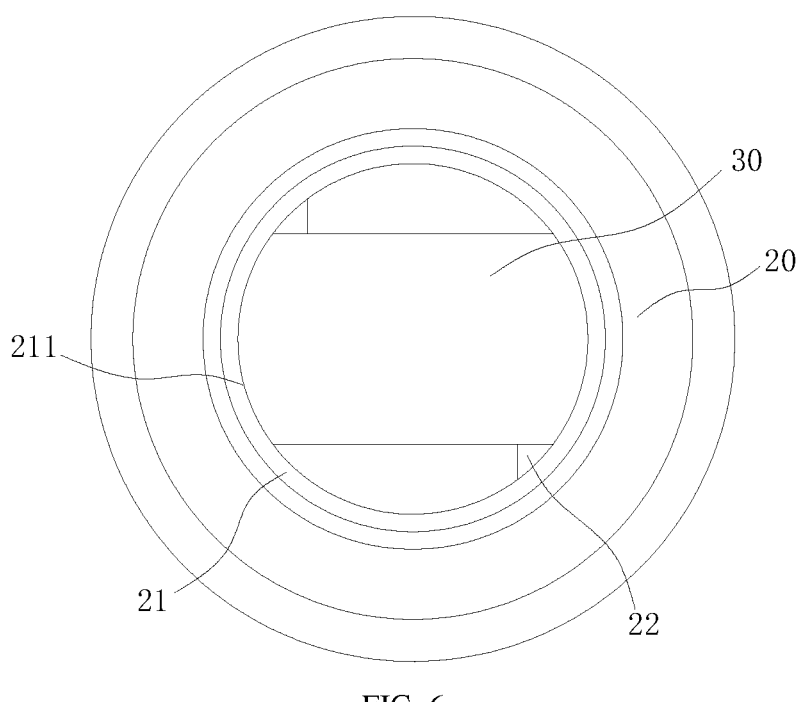
FIG. 6 is a bottom view of a valve seat and a valve rod when a limiting component of the valve seat abuts against the valve rod in another embodiment of the present disclosure.
Figure 7:
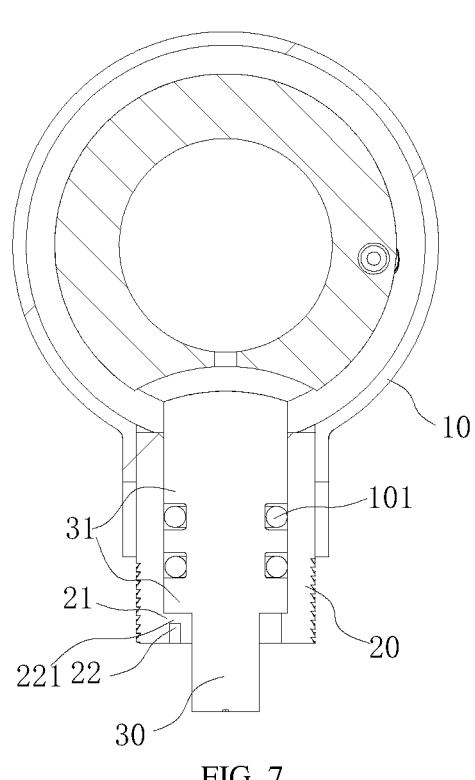
FIG. 7 is a cross-sectional schematic diagram of a ball valve in one or more embodiments of the present disclosure.

Referring to FIGS. 1 to 7, an embodiment of the present disclosure provides a ball valve. The ball valve includes a valve body 10, a valve seat 20, and a valve rod 30.

The valve seat is installed on the valve body 10. One end of the valve rod 30 is rotatably installed in the valve body 10, and the other end of the valve rod 30 penetrates through the valve body 10 and extends out of the valve body 10 via the valve seat 20. Such that, during an operation of the ball valve, the valve rod 30 can be driven to rotate on the valve body 10, so as to meet an operation for opening or closing the ball valve. A part of the valve rod 30 disposed in the valve body 10 is connected to a sphere (not shown), such that the valve rod 30 is capable of driving the sphere to rotate in the valve body 10, thereby realizing opening or closing the ball valve. The valve seat 20 is capable of being integrated with the valve body 10, or being connected to and being installed on the valve body 10 by welding and so on.

In the present disclosure, a portion of the valve rod 30 penetrating through the valve seat 20 is provided with a limiting convex ring 31. A convex edge 21 is provided on an end of the valve seat 20 away from the valve body 10. An end of the convex edge 21 towards the valve body 10 abuts against the limiting convex ring 31 to prevent the valve rod 30 from separating from the valve body 10.

In the ball valve of the present disclosure, a limitation of the valve rod 30 on the valve body 10 can be realized by abutting the convex edge 21 in the valve seat 20 against the limiting convex ring 31, so as to reduce an size of the overall valve rod 30, which is not only conducive to producing and preparing the valve rod 30, but also reduces a size of a blank part required to produce the valve rod 30, thereby reducing a use of a material and a cost. Meanwhile, by the convex edge 21 configured to limit the valve rod 30 in the valve seat 20, it can reduce a size of a structure and a production cost of the valve seat 20.

In particular, the convex edge 21 abuts against the limiting convex ring 31 by one surface being in contact with another surface, thereby realizing a contact fit between the convex edge 21 and the limiting convex ring 31, increasing a contact area between the convex edge 21 and the limiting convex ring 31 when the convex edge 21 abuts against and the limiting convex ring 31, resulting in improving a stability of the valve rod 30 limited in the valve body 10 by fit between the convex edge 21 and the limiting convex ring 31.

In particular, the convex edge 21 is in a circular ring structure, such that a specific structure of the convex edge 21 can be realized, thereby increasing a contact area between the convex edge 21 and the limiting convex ring 31. The convex edge 21 is not limited by drawings, for one skilled in the art, the convex edge 21 can be designed as an arc structure or other appropriate structures, which is not described herein.

Along an axis of the valve seat 20, a size of the convex edge 21 is not less than 3 mm. By such arrangement, structure strength of the convex edge 21 can be ensured, resulting in facilitating to the convex edge 21 limiting the valve rod 30, which means that a pressure of the convex edge 21 withstanding when the convex edge 21 abuts against and limits the limiting convex ring 31 is required to greater than a designed pressure of the valve rod in the ball valve, this parameter design can ensures a strength requirement of the ball valve, thereby meeting an use requirement of the ball valve.

In the present disclosure, the limiting convex ring 31 is integrated with the valve rod 30. In some embodiments, the convex edge 21 is integrated with the valve seat 20, facilitating a preparation of the valve rod 30 and/or the valve seat 20. Alternatively, the limiting convex ring 31 and the valve rod 30 can be fixedly connected to each other by welding or other ways, and the convex edge 21 and the valve seat 20 can be fixedly connected to each other by welding or other ways, which is not described herein.

In the present disclosure, a sealing ring 101 is embedded into the limiting convex ring 31, and the valve rod 30 is assembled and sealed with the valve seat 20 by the sealing ring 101. In the ball valve of the present disclosure, the sealing ring 101 configured to seal the valve rod 30 and the valve seat 20 is integrated on the limiting convex ring 31, such that, during a production of the limiting convex ring 31, the limiting convex ring 31 can be configured to limit the valve rod 30 on the valve body 10 and assemble the valve rod 30 with the valve seat 20 is integrated on the limiting convex ring 31, resulting in facilitating to preparing the valve rod 30 and simplifying the processes of the valve rod 30.

In addition, a limiting component 22 is provided on the valve seat 20, and the valve rod 30 can abut against the limiting component 22 to limit a maximum rotating angle of the valve rod 30 in the valve seat 20 as 90°. Therefore, not only it can limit a rotating angle of the valve rod 30, but also it can simplify a structure, reduce a process difficulty, and it is conducive to installing, resulting in reducing a production cost of the ball valve.

In particular, by the valve rod 30 abutting against the limiting component 22, a stability when the valve rod 30 abuts against and fits with the limiting component 22 increases and the maximum rotating angle of the valve rod 30 in the valve seat 20 can be ensured as 90°, which meets the use requirement of the ball valve and improves an operation stability of the ball valve. The limiting component 22 has two abutting surfaces perpendicular to each other, the valve rod 30 can be in contact with one of the two abutting surfaces of the limiting component 22 at an initial position and can be in contact with the other of the two abutting surfaces of the limiting component 22 at a position after the valve rod 30 rotates 90°, so as to limit the maximum rotating angle of the valve rod 30 limited by the limiting component 22 when the valve rod 30 rotates in the valve seat 20 as 90°.

In the present disclosure, the limiting component 22 is disposed on an inner wall 211 of the convex edge 21, so as to achieve an arrangement of the limiting component 22 on the valve seat 20. The limiting component 22 can be integrated on the convex edge 21, facilitating a production of the valve seat 20 and reducing a cost.

In particular, an end of the limiting component 22 towards the valve body 10 abuts against the limiting convex ring 31, or a gap 221 is formed between an end surface of the limiting component 22 towards the valve body 10 and the limiting convex ring 31. The end of the limiting component 22 towards the valve body 10 can be in flush with the step surface 212 or separated from the step surface 212 on the convex edge 21, the step surface 212 is configured to limit the limiting convex ring 31, so as to realize different arrangement of the limiting components 22 disposed on the convex edge 21 in different embodiments.

The various technical features of the above embodiments can be combined in any way. In order to make the description concise, not all possible combinations of the various technical features in the above embodiments have been described. However, as long as there is no contradiction in the combination of these technical features, they should be considered within the scope of this specification.

The above embodiments only express several embodiments of the present disclosure, and their descriptions are more specific and detailed, but should not be understood as limiting the scope of the disclosure. It should be pointed out that for ordinary skill in the art, several modifications and improvements can be made without departing from the concept of the disclosure, which are within the scope of protection of the disclosure. Therefore, the scope of protection of the present disclosure should be based on the attached claims.

What is claimed is:

1. A ball valve comprising a valve body, a valve seat and a valve rod, wherein the valve seat is installed on the valve body, one end of the valve rod is rotatably installed in the valve body, the other end of the valve rod extends out of the valve body via the valve seat;

a portion of the valve rod penetrating through the valve seat is provided with a limiting convex ring, an end of the valve seat away from the valve body is provided with a convex edge, an end of the convex edge towards the valve body abuts against the limiting convex ring to prevent the valve rod from separating from the valve body;

the convex edge is integrated with the valve seat; a limiting component is provided on the valve seat, the valve rod is capable of abutting against and fitting with the limiting component to restrict a maximum rotating angle of the valve rod in the valve seat as 90°; the limiting component is disposed on an inner wall of the convex edge; and a gap is formed between an end of the limiting component towards the valve body and the limiting convex ring.

2. The ball valve of claim 1, wherein the convex edge abuts against the limiting convex ring by being in contact with each other.

3. The ball valve of claim 2, wherein the convex edge is provided as a circular ring.

4. The ball valve of claim 1, wherein along an axis of the valve seat, a size of the convex edge is not less than 3 mm.

5. The ball valve of claim 1, wherein the limiting convex ring is integrated with the valve rod.

6. The ball valve of claim 1, wherein a sealing ring is embedded into the limiting convex ring, and the valve rod is assembled with and sealed with the valve seat by the sealing ring.

7. The ball valve of claim 1, wherein the valve rod is capable of abutting against and fitting with the limiting component by being in contact with each other.

\* \* \* \* \*